US007044157B2

(12) United States Patent
Vassanelli

(10) Patent No.: US 7,044,157 B2
(45) Date of Patent: May 16, 2006

(54) BY-PASS VALVE UNIT FOR A HIGH PRESSURE LIQUID DELIVERY UNIT

(75) Inventor: Felice Vassanelli, Cavaion Veronese (IT)

(73) Assignee: S.I.S.T.E.M.A. S.R.L., Villafrance di Verona (IT)

( * ) Notice: Subject to any disclaimer, the term of this patent is extended or adjusted under 35 U.S.C. 154(b) by 123 days.

(21) Appl. No.: 10/763,264

(22) Filed: Jan. 26, 2004

(65) Prior Publication Data

US 2004/0164176 A1 Aug. 26, 2004

(30) Foreign Application Priority Data

Jan. 28, 2003 (IT) .......................... RE2003A0010

(51) Int. Cl.
*F16K 15/00* (2006.01)

(52) U.S. Cl. ................................. 137/538; 137/565.35

(58) Field of Classification Search ................ 137/538, 137/565.35

See application file for complete search history.

(56) References Cited

U.S. PATENT DOCUMENTS 6,543,476 B1 4/2003 Kazaoka

*Primary Examiner*—Philippe Derakshani
(74) *Attorney, Agent, or Firm*—Browdy and Neimark, PLLC

(57) ABSTRACT

The unit of the invention comprises a motor-driven high pressure pump (11) having a delivery side (13) and a suction side (14), and a delivery gun (15) connected to the pump delivery side (13) by a delivery conduit (16) having a flow on-off valve. The valve unit comprises a by-pass valve (25, 33) arranged to close or alternatively, when in the open state, to enable direct flow passage between the delivery side (13) and the suction side (14), and having a control means (31, 32) sensitive to the liquid pressure in the delivery conduit (16); said control means comprises two valving elements (31, 32) which are normally joined together to form one piece in contact with the liquid of the delivery conduit (16), but which separate when the pressure in the delivery conduit (16) exceeds the normal delivery value ($P_1$) following flow interruption by the delivery gun (15), to hence provide direct passage for the liquid from the delivery conduit (16) to the suction side (14).

8 Claims, 4 Drawing Sheets

BY-PASS VALVE UNIT FOR A HIGH PRESSURE LIQUID DELIVERY UNIT

FIELD OF THE INVENTION

The present invention relates to a by-pass valve unit for a high pressure liquid delivery unit, in particular for a high pressure jet washer.

High pressure jet washers, and more generally high pressure liquid delivery units, to which the invention refers, comprise a motor-driven high pressure pump having a delivery side and suction side, and a delivery gun connected to the pump delivery side by a delivery conduit and having a flow on-off valve, a source of liquid being connected to the pump suction side.

It is known to connect into said unit a by-pass valve arranged to close or alternatively, when open, to allow direct flow passage between the delivery side and suction side, and having a control means sensitive to the liquid pressure in the delivery conduit.

In greater detail, when the gun of the jet washer is required to deliver liquid, its on-off valve is held in the open position; when in this state, the delivery conduit is traversed by the entire flow leaving the pump delivery side and the by-pass valve is closed.

When liquid delivery is to be interrupted, the gun valve is closed with the consequent production of a water hammer effect, with a sudden increase in pressure together with a sort of pressure rebound upstream of the on-off valve; this causes the control means of the by-pass valve to open this latter and hence directly connect the pump delivery side and suction side together (by-pass). This is necessary both to prevent excessive pressure arising in the delivery side, in the conduits and in the members connected thereto, and to enable the motor and pump to operate at low pressure with low energy consumption.

In some constructions, delivery interruption also causes stoppage of the motor by a stop control (for example a switch in the case of an electric motor) on which the by-pass valve acts always mechanically. However motor and pump stoppage occurs after the water hammer effect has been produced in the delivery conduit and moreover, because of the inevitable inertia possessed by the rotary members of the motor and pump, a transient regime is present in which the pump continues to operate after closure of the gun valve; consequently the delivery side and suction side have to again be directly connected together.

To be able to operate, said by-pass valves possess a non-return valve which prevents the fluid in the delivery conduit from returning to the delivery side when the gun valve is closed, in order to maintain a certain pressure in the delivery conduit such as to keep the by-pass flow passage between the delivery side and the suction side open.

This however means that within the delivery conduit a relatively high pressure persists produced by the water hammer effect, which is considerably greater than the delivery pressure; this is decidedly detrimental to the integrity of the members subjected to this pressure, and becomes more detrimental the longer the pressure is maintained at these values. This drawback is further magnified if the delivered liquid is heated.

SUMMARY OF THE INVENTION

An object of the present invention is to provide a valve unit which in addition to enabling the flow to by-pass between the delivery side and the suction side when open, is also able to discharge the excess pressure produced by the water hammer effect within the delivery conduit.

Another object is to provide a by-pass valve unit also able to produce a mechanical movement able to operate a control means for halting the motor.

Another object is to provide a by-pass valve unit also able to regulate the delivery flow rate.

These and other objects are attained by the invention as characterized in the claims.

The invention is based on the fact that the by-pass valve control means comprises two valving elements which are normally joined together to form one piece in contact with the liquid of the delivery conduit, but which separate when the pressure in the delivery conduit exceeds the normal delivery value following flow interruption by the delivery gun, to hence cause the liquid to by-pass from the delivery conduit to the suction side.

The invention is described in detail hereinafter with the aid of the accompanying figures which illustrate one embodiment thereof by way of non-limiting example.

DESCRIPTION OF THE PREFERRED EMBODIMENT

Figure 1:
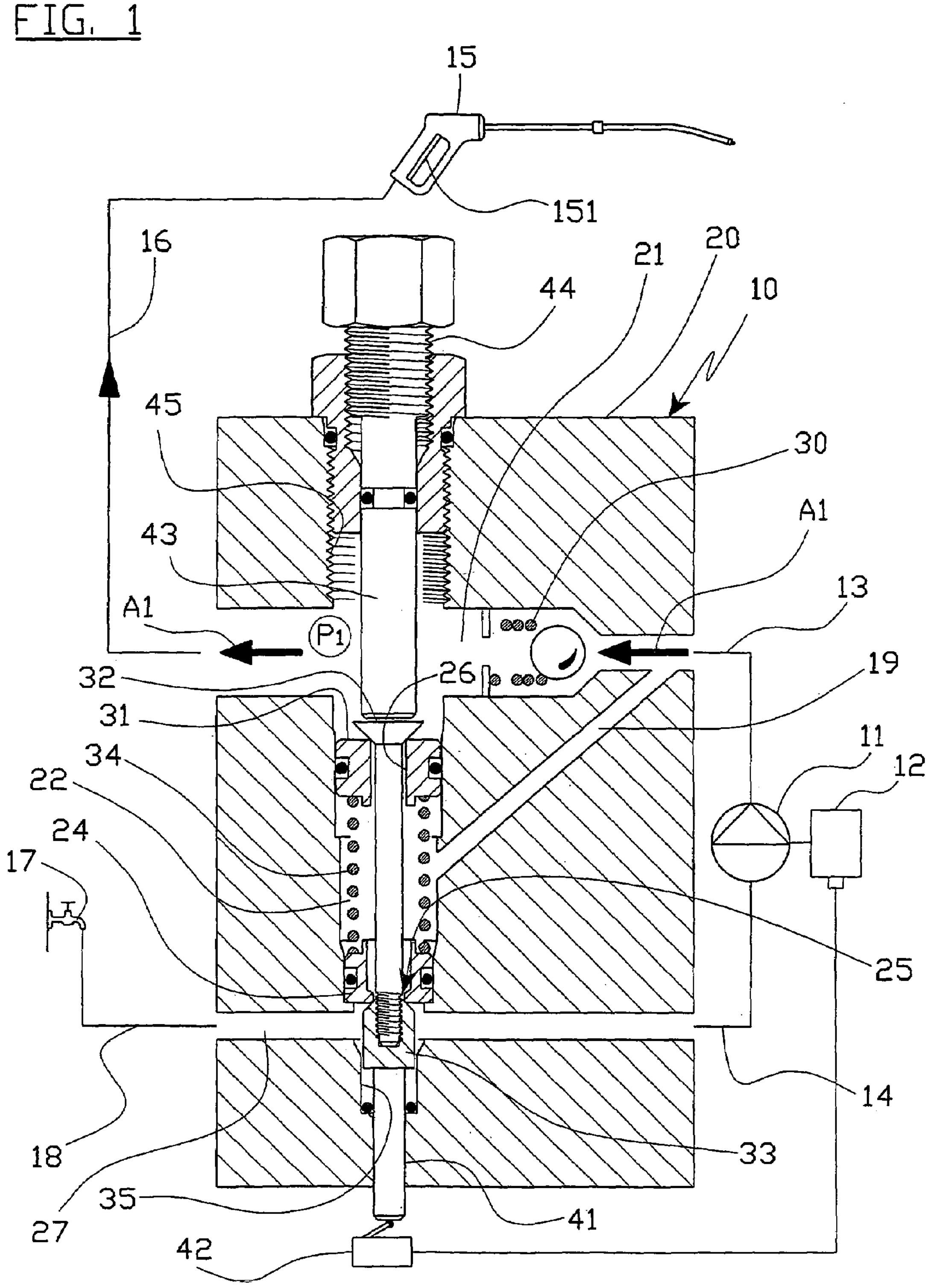
FIG. 1 is an overall section through the valve unit of the invention connected into a high pressure liquid delivery unit (in particular a jet washer) in which the delivery unit is shown schematically.

As shown schematically in FIG. 1, the liquid delivery unit (jet washer) comprises:

a high pressure pump 11 driven by a motor 12 and having a delivery side 13 and a suction side 14, a delivery gun 15, connected to the pump delivery side via a delivery conduit 16 and having a flow on-off valve 151, a liquid source 17 being connected to the pump suction side 14 by a feed conduit 18.

The delivery unit also comprises the valve unit of the invention, which is indicated overall by 10 and is positioned downstream of the gun 15. In the figures this valve unit 10 is shown as a unit separate from the pump 11; in practice it can be either a separate unit or a unit incorporated into the pump.

For ease of description, the invention is illustrated in the ensuing description and claims with reference to the orientation shown in the figures, however any orientation can be used in practice.

The valve unit 10 comprises an upper chamber 21, provided within a valve body 20 and connected to the delivery conduit 16 at one end and to the suction side 13 at the other end, and a lower chamber 22, positioned below the upper chamber 21 and also provided within the valve body 20.

The lower chamber 22 is connected to the pump delivery side 13 via an always open conduit 19, and to the suction side 14 via a lower liquid passage orifice 25 provided axially through a stop member 24 positioned at the lower end of the lower chamber 22, and which, when open, enables the flow to pass directly between the delivery side 13 and the suction side 14 (by-pass) via the conduit 19 and chamber 22. In the embodiment shown in the figures, the lower orifice 25 opens into a transverse lower channel 27 provided in the body 20 below the chamber 22, to connect together the feed conduit 18 and the suction side 14.

The unit 10 also comprises a first upper valving element 31 and a second upper valving element 32, normally joined together to form one piece in contact with the liquid in the upper chamber 21, to define a control means sensitive to the liquid pressure in the delivery conduit 16, and a third valving element 33, positioned below the lower orifice 25 and arranged to close the lower mouth thereof.

The first valving element 31 is positioned to separate the two chambers 21 and 22 and presents an upper orifice 26, which connects together the two chambers 21 and 22 to enable the liquid to pass directly from the upper chamber 21 (and hence from the delivery conduit 16) to the suction side 14.

The second valving element 32 is normally positioned to close the upper orifice 26, and opens this latter when the liquid pressure in the delivery conduit 16 exceeds the normal delivery pressure following flow interruption by the valve 151 of the delivery gun 15.

At the point in which the delivery conduit enters the upper chamber 21 there is a non-return valve 30 which is open when the flow enters the chamber 21 from the suction side 13, whereas it closes if the flow is in the opposite direction, to block liquid exit from the chamber 21.

The first valving element 31 is subjected to the action of an elastic means 34 arranged to urge it upwards, in particular a helical spring precompressed between the member 24 and the valving element 31.

The second valving element 32 is of downwardly converging frusto-conical shape and is positioned in contact with the upper mouth of the upper orifice 26, to be constrained to the first valving element 31 by a bearing constraint which acts only when the first valving element 31 is thrust upwards relative to the second valving element 32 and vice versa the second valving element 32 is thrust downwards relative to the first valving element 31.

The second valving element 32 is joined to the upper end of an axial rod **32*a* which passes through the upper orifice 26 and extends downwards to pass axially through the entire lower chamber 22 and then through the lower orifice 25, to emerge from the chamber 22; the lower end portion of the rod 32*a* is external to the chamber 22 and carries fixed thereto the third valving element 33; in this manner the second valving element 32 is rigidly joined to the third valving element 33, this latter opening the passage through the lower orifice 25 following its downward movement as a result of an equal movement of the second valving element 32**.

At the same time, the upward movement of the second valving element 32 is limited by the engagement of the third valving element 33 with the lower mouth of the lower orifice 25. In its turn, the upward movement of the first valving element 31 is limited by its engagement with the second valving element 32.

FIG. 1 shows the state of the valve unit 10 during liquid delivery by the gun 15. The fluid originating from the delivery side 13 runs freely through the chamber 21 and along the delivery conduit 16 (arrows A1), without the valve 30 impeding the flow. Under these conditions the lower chamber 22 is closed and the liquid present therein is at the same pressure as the upper chamber 21.

The active surface of the control means formed by the two upper valving elements 31 and 32 subjected to the pressure present in the upper chamber 21 is greater than the corresponding active surface subjected to the pressure present in the lower chamber 22 by a value $\Delta S$ equal to the area of the cross-section of the rod **32*a*, in that this passes completely through the lower chamber 22 without hence being influenced by the pressure present therein. Consequently, although the control means 31, 32 is subjected to equal and opposite pressures in the two chambers 21 and 22, because of the surface difference $\Delta S$ it is subjected to a downward thrust equal to $P_1 \times \Delta S$ (where $P_1$ is the pressure in the upper chamber 21); however this thrust is overcome by the force of the spring which has the value $F > P_1 \times \Delta S$ and hence maintains the first valving element 31 urged against the second valving element 32, the travel of which is limited by the engagement of the third valving element 33 against the lower orifice 25; this means that the third valving element 33 is maintained urged upwards, hence closing the lower orifice 25, while the first valving element 31, being urged against the second valving element 32, closes the upper orifice 26. It should be noted that the passage cross-section through the orifice 25 is relatively small as the orifice is partly occupied by the rod 32*a*; consequently the downwardly acting thrust on the valving element 33 produced by the pressure in the chamber 22 is relatively small and is hence also overcome by the force of the spring 34. The lower end portion of the rod 32*a* is threaded and engages in a corresponding threaded axial dead hole 33*a* provided in the third valving element 33; this makes it possible to vary the length of that portion of the rod 32*a* interposed between the valving element 32 and the valving element 33 (i.e. the distance between the valving element 32 and the member 24) and hence also vary the degree of precompression of the spring 34 and thus its reaction force F, to adjust it on the basis of the delivery pressure of the pump 11** in operation.

Consequently, in the state shown in FIG. 1, the third valving element 33 is in the closed position and an equal pressure is present in its two chambers 21 and 22, equal to the delivery pressure; and the liquid flows freely from the delivery side 13 through the delivery conduit 16 to the gun 15, from which it is propelled to the outside.

Figure 2B:
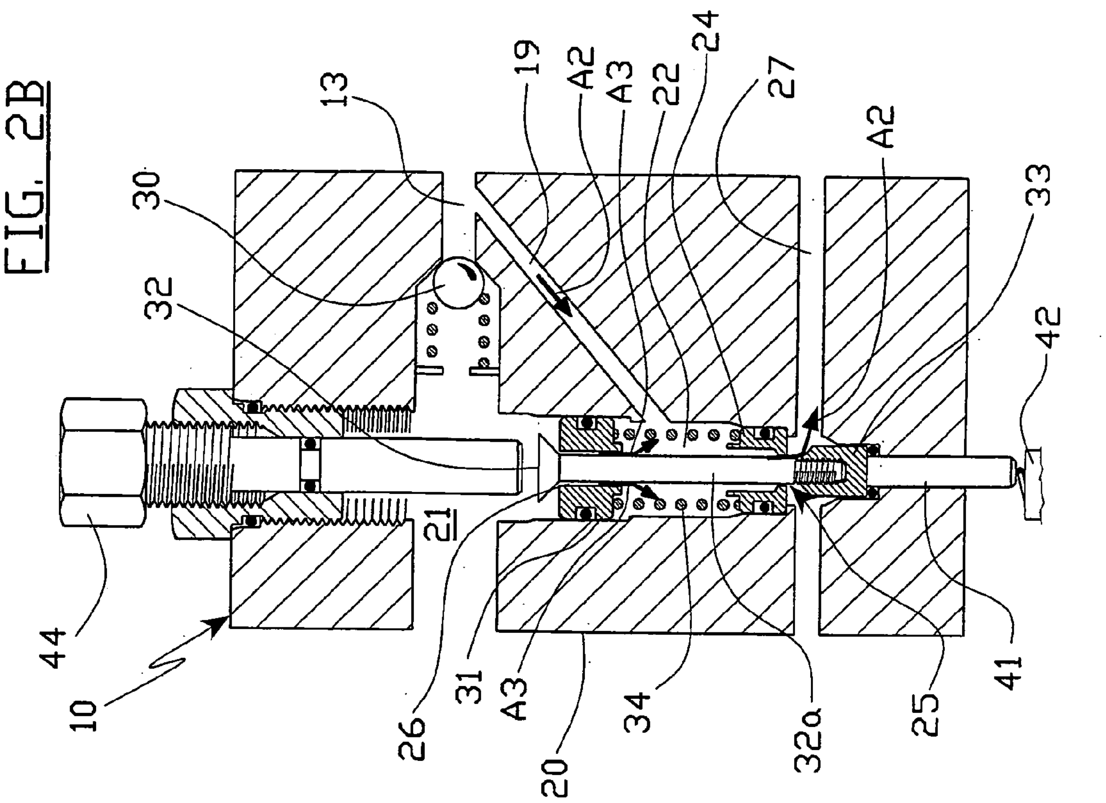
FIGS. 2A, 2B, 2C and 2D show the valve unit of FIG. 1 in four different stages of operation.
Figure 2A:
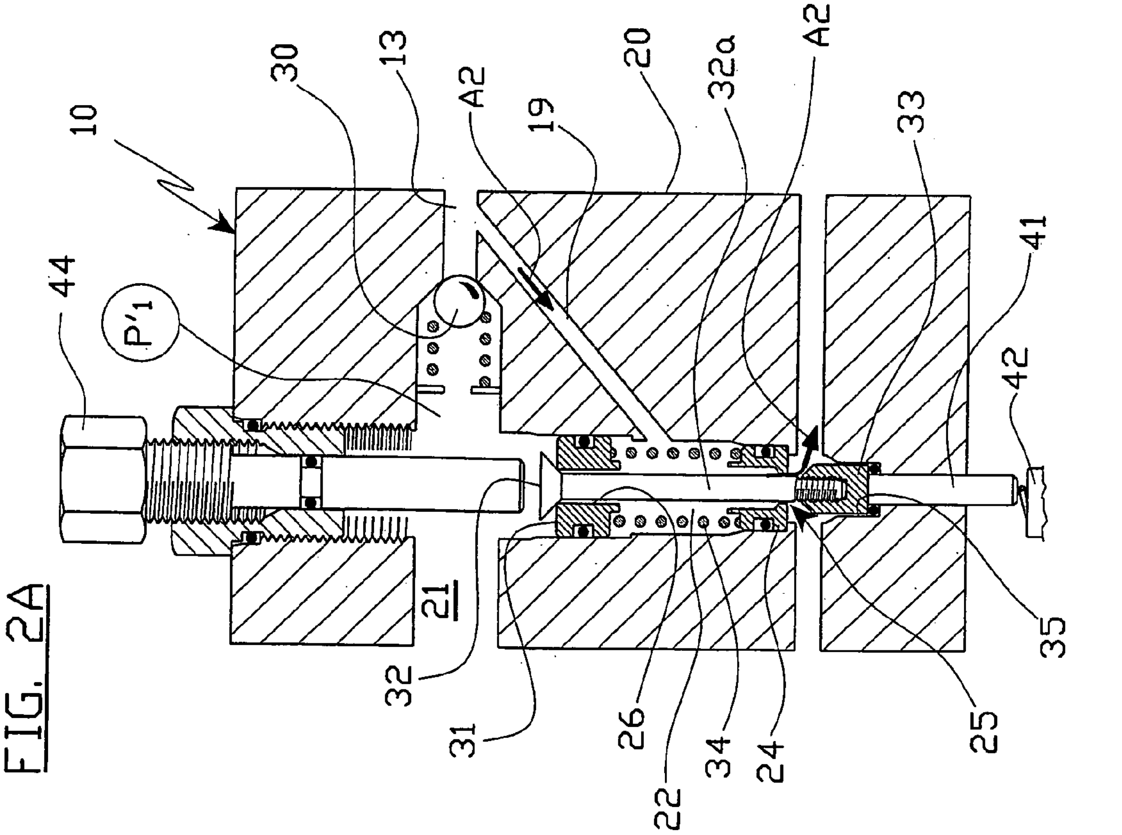

FIGS. 2A and 2B show the transient state of the valve unit at two successive moments immediately following interruption of flow delivery from the gun 15, following closure of the on-off valve 151.

As soon as the valve 151 closes, flow along the delivery conduit 16 and into the upper chamber 21 is interrupted (with consequent closure of the valve 30). A momentary pressure increase in the upper chamber 21 follows caused both by the fact that the pump continues to operate and hence the delivery pressure increases, and possibly by the water hammer effect produced by the rapid closure of the valve 151; this momentarily higher pressure ($P'_1$) produces, by virtue of the active surface difference $\Delta S$, a downward thrust which overcomes the thrust of the spring 34, this being sized such as to be greater than the thrust $P_1 \times \Delta S$ produced during delivery (as already described with reference to FIG. 1) but less than the thrust $P'_1 \times \Delta S$ produced under these circumstances.

Figure 1A:
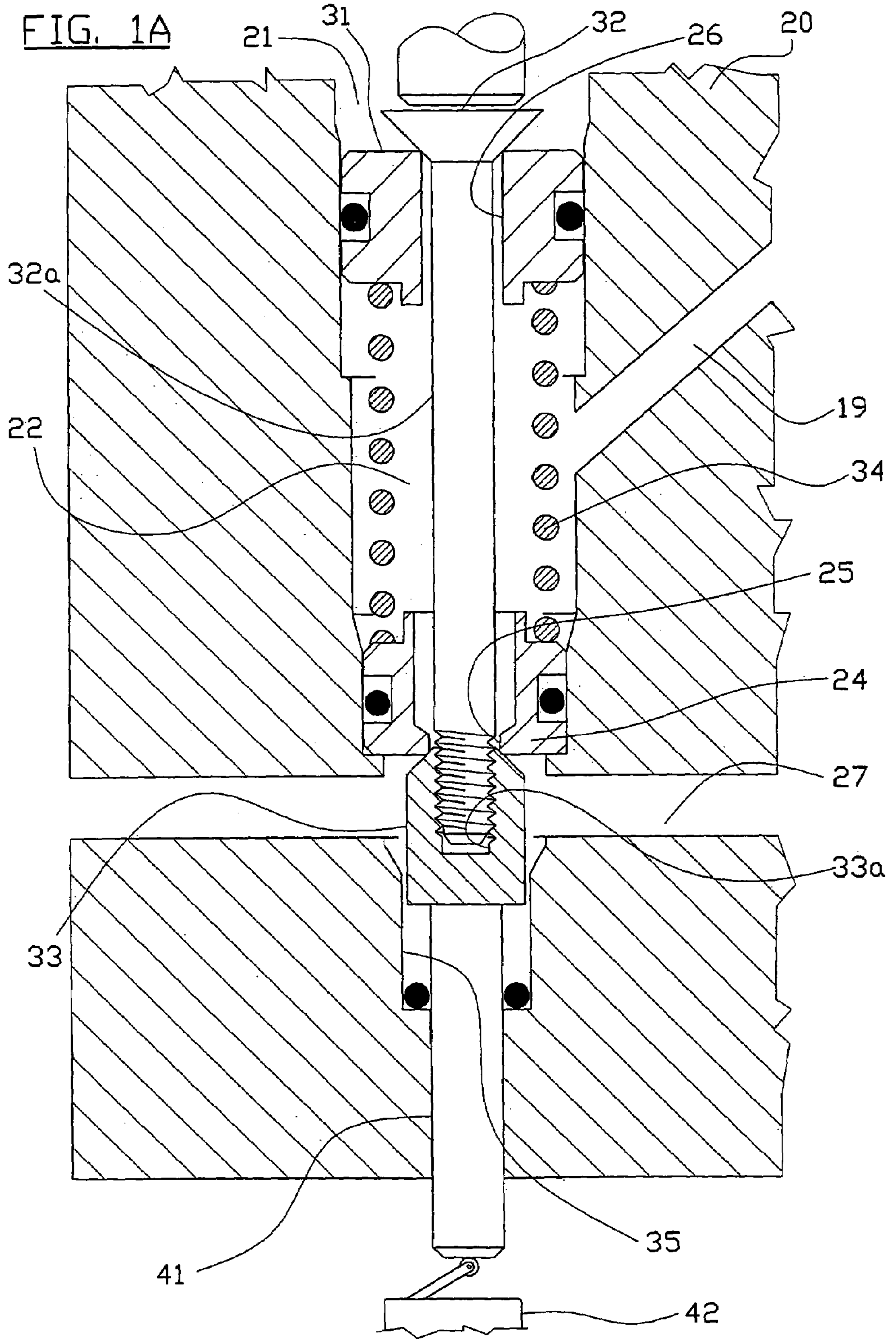
FIG. 1A is an enlarged detail of FIG. 1.

Consequently the upper chamber 21 expands and the two valving elements 31 and 32 are moved downwards together (see FIG. 1A), the third valving element 33 hence also moving downward to open the lower orifice 25; consequently the delivery side 13 is set to by-pass via the conduit 19, the chamber 22 and the orifice 25 (arrow A2).

It follows that the pressure in the lower chamber 22 falls considerably (being connected to the suction side 14), with consequent increase in the downward thrust acting on the two upper valving elements 31 and 32. The downward movement of the lower valving element 33 is limited by the fact that it abuts against the base of a vertical axial seat 35 within which it moves.

After the valving element 33 has reached its end-of-travel position in this manner, with consequent halting of the travel of the second valving element 32, as the pressure in the upper chamber 21 is preponderant over the lower chamber 22 a thrust acts on just the first valving element 31 which continues its downward travel; consequently the valving element 32 rises relative to the valving element 31 with consequent opening of the upper orifice 26 (as shown in FIG. 2B) to directly connect (by-pass) the delivery conduit 16 to the suction side 14 (arrows A3). The excess pressure produced by the water hammer effect within the delivery conduit is consequently discharged, as precisely proposed by the invention.

Figure 2D:
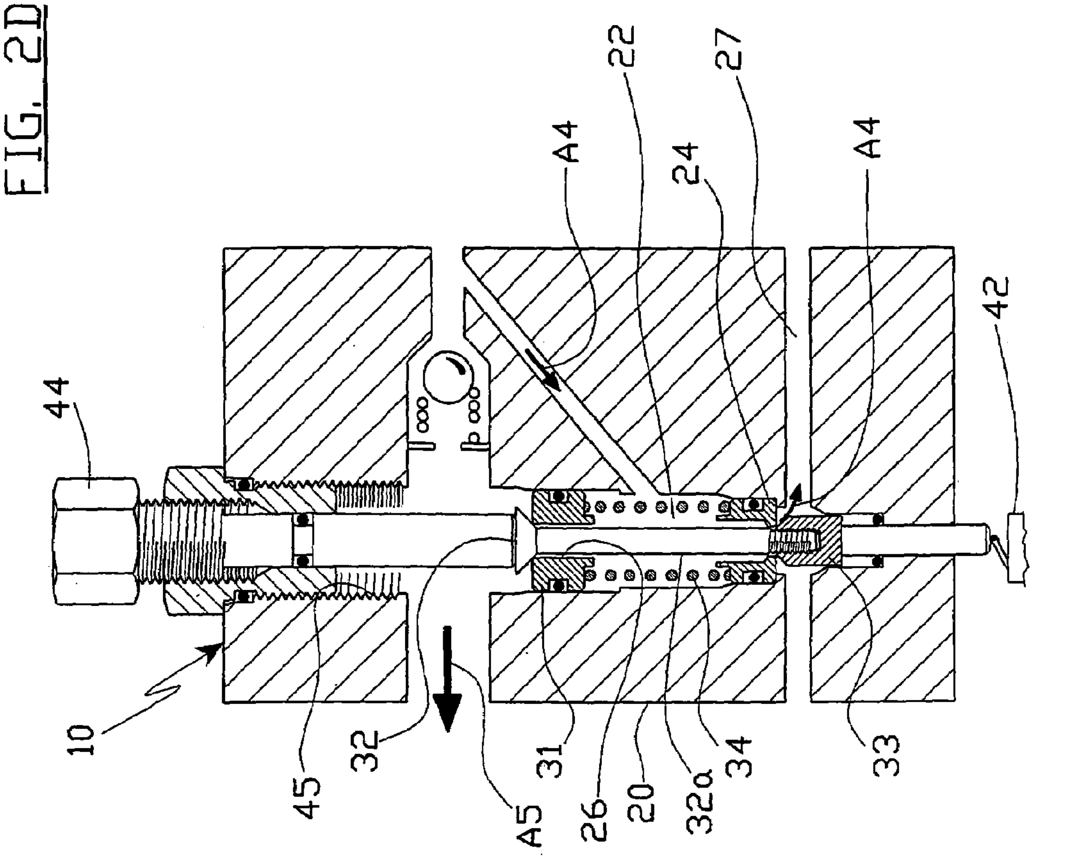
Figure 2C:
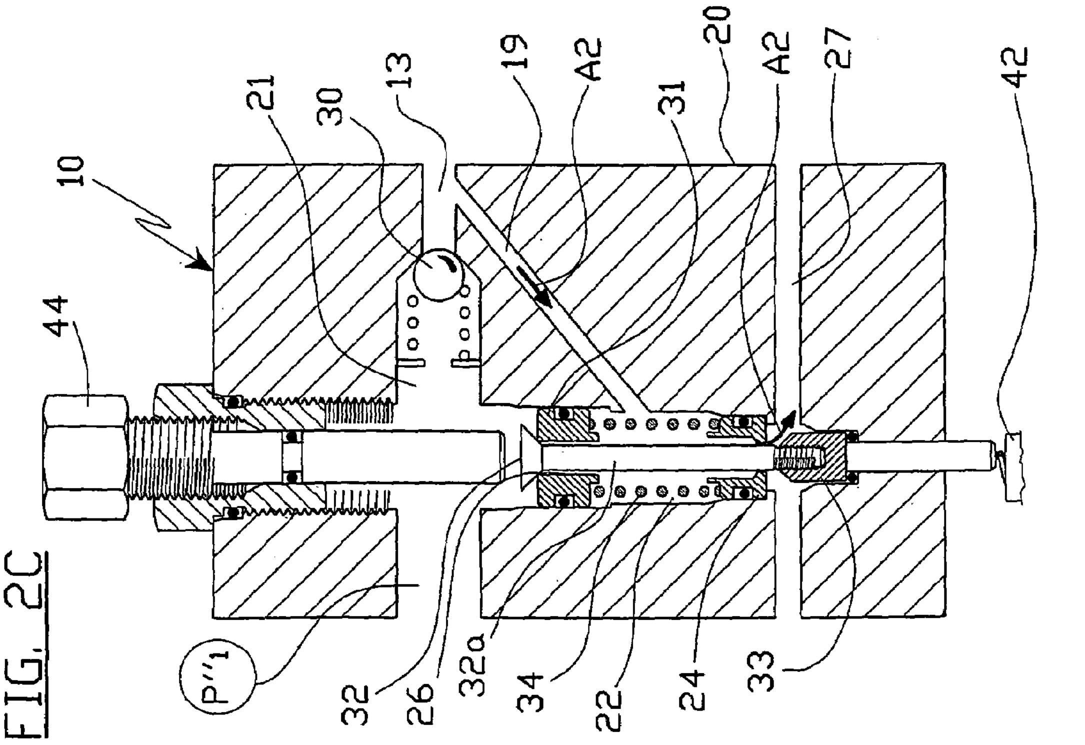

Once said pressure $P'_1$ has been discharged, the pressure in the chamber 21 falls (to a value $P''_1$ less than the value $P_1$ during delivery and higher than that present in the lower chamber 22) until the thrust of the spring 34 overcomes the thrust produced by the pressure difference across the first valving element 33 and hence returns it upwards against the second valving element 32; the valve unit 10 now returns to the state shown in FIG. 2C, which is stationary and is substantially identical to that shown in FIG. 2A; however, in this state the pressure $P''_1$ in the chamber 21 is less than the pressure $P'_1$ in this state. In this state the valving element 32 is urged downwards to its end-of-travel position by the pressure difference between the two chambers 21 and 22 and the valving element 31 is urged upwards against it by the spring 34, without however this overcoming the thrust which maintains the valving element 32 in its downward end-of-travel position.

In conclusion, the two upper valving elements 31 and 32 remain joined together in their lower end position to allow by-pass to occur between the delivery side and suction side (arrows A2), while the delivery conduit 16 is at a pressure $P''_1$ which is relatively low and in any event less to even a considerable extent that the delivery pressure.

In the embodiment shown in the figures, the valve unit 10 also comprises a stem 41 which is directly operated by the lower valving element 33 and has one end positioned external to the body 20 of the valve unit to mechanically operate a control means for halting the pump motor, for example an electrical switch 42 if the motor is electric, when the pressure in the delivery conduit 16 exceeds the normal delivery value following flow interruption by the delivery gun, i.e. as soon as the second valving element 32 is brought into its lower position (state shown in FIGS. 2A, 2B and 2C).

There is also provided, in the embodiment shown in the figures, an axial push rod 43 which projects from the top downwards into the upper chamber 21 until it abuts against the upper end of the second valving element 32. The axial position of the push rod 43 is adjustable by an adjustment screw 44 located in a threaded seat 46 above the upper chamber 21.

The push rod 43 can be lowered until it moves the second valving element 32 and with it the lower valving element 33 downwards, as shown in FIG. 2D, to open the lower orifice 25 to a gauged extent such that during delivery, a constant adjustable part of the flow originating from the delivery side 13 goes directly to discharge 14 through this opening (arrows A4), while the remaining part of the flow (arrows A5) is delivered through the delivery conduit 16.

In this manner it is therefore possible to adjust the rate and pressure of the flow delivered by the gun 15 without substantially altering the setting of the spring 34, hence leaving discharge of the excess pressure produced by the water hammer effect substantially unaltered.

Numerous modifications of a practical and applicational nature can be made to the invention but without leaving the scope of the inventive idea as claimed below.

The invention claimed is:

1. A by-pass valve unit for a high pressure liquid delivery unit, the delivery unit comprising:

a motor-driven high pressure pump (11) having a delivery side (13) and a suction side (14), and a delivery gun (15) connected to the pump delivery side (13) by a delivery conduit (16) and having a flow on-off valve, a source of liquid being connected to the pump suction side (14), the valve unit comprising a by-pass valve (25, 33) arranged to close or alternatively, when in the open state, to enable direct flow passage between the delivery side (13) and the suction side (14), and having a control means (31, 32) sensitive to the liquid pressure in the delivery conduit (16), characterized in that said control means comprises two valving elements (31, 32) which are normally joined together to form one piece in contact with the liquid of the delivery conduit (16), but which separate when the pressure in the delivery conduit (16) exceeds the normal delivery value ($P_1$) following flow interruption by the delivery gun (15), to hence provide direct passage for the liquid from the delivery conduit (16) to the suction side (14), and further comprising:

an upper chamber (21) connected to the delivery conduit (16), a lower chamber (22) connected to the pump delivery side (13) and having a lower liquid passage orifice (25) connected to the suction side (14) to enable said direct flow passage between the delivery side (13) and the suction side (14), and a third orifice (33) arranged to close or open the lower passage orifice (25), the first (31) of said two valving elements (31, 32) of the control means being positioned to separate the two chambers (21 and 22) and presenting an upper orifice (26) for direct liquid passage from the delivery conduit (16) to the suction side (14), the second (32) of said two valving elements (31, 32) being normally positioned to close the upper passage orifice (26), and opening this latter when the pressure in the delivery conduit (16) exceeds the normal delivery pressure (P1) following flow interruption by the delivery gun (15).

2. A valve unit as claimed in claim 1, characterized in that said second valving element (32) opens the upper passage orifice following its downward movement together with the first valving element (31) and its subsequent stoppage in its end-of-travel position, while the first valving element (31) continues its downward travel.

3. A valve unit as claimed in claim 1, characterized in that the first valving element (31) is subjected to the action of an elastic means (34) arranged to urge it upwards, and is constrained to the second valving element (32) by a bearing constraint which acts only when the first valving element (31) is thrust upwards against the second valving element (32) and vice versa the second valving element (32) is thrust downwards against the first valving element (31).

4. A valve unit as claimed in claim 1, characterized in that the second valving element (32) is rigidly joined to the third valving element (33), which opens the lower orifice (25)

following its downward movement as a result of an equal movement of the second valving element (32).

5. A valve unit as claimed in claim 4, characterized in that the upward movement of the second valving element (32) is limited by the engagement of the third valving element (33) with the closure seat of the lower orifice (25).

6. A valve unit as claimed in claim 4, characterized in that the second valving element (32) is joined to the upper end of an axial rod (32*a*) which passes through the upper orifice (26) and axially traverses the entire lower chamber (22) and passes through the lower orifice (25), to emerge from the chamber (22); the third valving element (33) being fixed to that portion of the rod (32*a*) external to the chamber (22).

7. A valve unit as claimed in claim 4, characterized by comprising an axial push rod (43) which projects from the top downwards into the upper chamber (21) until it abuts against the upper end of the second valving element (32), the axial position of the push rod (43) being adjustable to downwardly move the second valving element (32) and with it the lower valving element (33), to open the lower orifice (25) to a gauged extent.

8. A valve unit as claimed in claim 4, characterized by comprising a stem (41) which is directly operated by the lower valving element (33) and has one end positioned external to the body (20) of the valve unit to mechanically operate a control means (42) for halting the motor (12), when the second valving element (32) is brought into its lower position.

* * * * *